United States Patent
Kim et al.

(10) Patent No.: US 7,316,023 B2
(45) Date of Patent: Jan. 1, 2008

(54) DISC DRIVE TRAY FOR HOLDING DISCS OF VARIOUS SHAPES AND SIZES

(75) Inventors: Sang-Tae Kim, Suwon-si (KR); Jae-Soo Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 373 days.

(21) Appl. No.: 10/812,557

(22) Filed: Mar. 30, 2004

(65) Prior Publication Data

US 2004/0244019 A1    Dec. 2, 2004

(30) Foreign Application Priority Data

May 28, 2003   (KR) ................ 10-2003-0034033

(51) Int. Cl.
*G11B 33/02*   (2006.01)
*G11B 17/04*   (2006.01)
*G11B 17/03*   (2006.01)

(52) U.S. Cl. .................................... 720/604
(58) Field of Classification Search ............... 720/604
See application file for complete search history.

(56) References Cited

U.S. PATENT DOCUMENTS

| | | | |
|---|---|---|---|
| 4,661,940 A * | 4/1987 | Camerik ................... 369/111 |
| 6,151,284 A * | 11/2000 | Watanabe et al. ......... 720/601 |
| 6,160,780 A * | 12/2000 | Furukawa et al. ......... 720/604 |
| 6,246,654 B1 * | 6/2001 | Omori et al. ............. 720/604 |
| 6,320,835 B1 * | 11/2001 | Kamei ...................... 720/653 |
| 6,341,115 B1 * | 1/2002 | Otani et al. ............... 720/653 |
| 6,907,611 B2 * | 6/2005 | Konno et al. ............. 720/604 |
| 6,910,218 B2 * | 6/2005 | Park et al. ................ 720/653 |
| 6,952,834 B2 * | 10/2005 | Inatani et al. ............. 720/696 |
| 2002/0044521 A1 * | 4/2002 | Sogawa et al. ............ 369/270 |
| 2002/0179465 A1 * | 12/2002 | Hui ........................... 206/310 |
| 2003/0123376 A1 * | 7/2003 | Inatani et al. ............. 369/270 |
| 2004/0163094 A1 * | 8/2004 | Matsui et al. ............. 720/650 |

FOREIGN PATENT DOCUMENTS

JP   06068574 A   *   3/1994

OTHER PUBLICATIONS

Korean Patent Application No. 1019980043118 to Lee, having Publication date of May 6, 2000 (w/ English Abstract page).

* cited by examiner

*Primary Examiner*—Angel Castro
*Assistant Examiner*—Christopher R. Magee
(74) *Attorney, Agent, or Firm*—Monica H. Choi

(57) ABSTRACT

A disc drive such as an optical disc drive for securely holding discs of various sizes and shapes even in the vertical position. The disc drive includes a tray for holding a disc with a spindle motor installed thereon for rotating a turntable of the spindle motor. The disc is secured to the turntable for being rotated by the spindle motor. A fixing unit disposed by the turntable securely holds the disc to the turntable at locations of a perimeter of a clamping hole of the disc.

9 Claims, 5 Drawing Sheets

DISC DRIVE TRAY FOR HOLDING DISCS OF VARIOUS SHAPES AND SIZES

BACKGROUND OF THE INVENTION

This application claims priority to Korean Patent Application No. 2003-0034033, filed on May 28, 2003, in the Korean Intellectual Property Office, the disclosure of which is incorporated herein in its entirety by reference.

1. Field of the Invention

The present invention relates generally to disc drives such as optical disc drives, and more particularly, to a tray of the disc drive with a mechanism for securely holding discs of various shapes and sizes.

2. Description of the Related Art

Typically, optical disc drives are devices which write or read information by radiating light on an optical medium (hereinafter, referred to as an optical disc) having a disc shape, such as a compact disc (CD) or a digital versatile disc (DVD).

FIG. 1 is a plane view showing a conventional optical disc drive. The conventional optical disc drive shown in FIG. 1 is a half-height type optical disc drive installed in a desk top computer. Referring to FIG. 1, the conventional optical disc drive includes a tray 20 and a main body 50 comprising a main frame 10 and a desk portion 30.

The tray 20 is installed to be slid on the main frame 10. To this end, rails 11 which guide a sliding motion of the tray 20 are disposed on the main frame 10. In general, the rails 11 are formed as an integral body with the main frame 10. In addition, a loading motor 13 which supplies power for sliding the tray 20 and a pinion gear 14 which is driven by the loading motor 13 are disposed in the main frame 10. A rack gear 22 which operates with the pinion gear 14 is disposed on a bottom surface of the tray 20.

The desk portion 30 includes a spindle motor 31 which rotates an optical disc D, and includes an optical pickup 32 which slides in a radial direction of the optical disc D for accessing the optical disc D. The desk portion 30 is installed in the main frame 10. When the tray 20 is loaded by a cam (not shown) connected to the loading motor 13, the desk portion 30 ascends toward a bottom surface of the optical disc D, and when the tray 20 is unloaded, the desk portion 30 descends.

When loading the optical disc D, the optical disc D is loaded onto a load surface 21 of the tray 20. In addition, the loading motor 13 is rotated such that the pinion gear 14 is rotated. Thus, a rotating force is transferred to the rack gear 22 such that the tray 20 is slid in toward the main frame 50. After the tray 20 is loaded, the desk portion 30 ascends toward the optical disc D. When the optical disc D is seated on a turntable 34 disposed on a shaft of the spindle motor 31, the loading operation is complete. Thereafter, as the spindle motor 31 is rotated, the optical disc D is rotated. The optical pickup 32 is slid in a radial direction of the optical disc D for accessing the optical disc D when writing or reproducing information. A process of unloading the optical disc D is performed in a reverse order of the above-described loading operation.

The load surface 21 is disposed on the tray 20. The optical disc D is loaded onto the load surface 21, and the load surface 21 is formed to be slightly stepped down from a top surface 24 of the tray 20. A diameter D1 of the load surface 21 is slightly larger than a diameter of the optical disc D. The center of the load surface 21 is concentric with the shaft of the spindle motor 31 when the tray 20 is loaded. If the optical disc D is loaded onto the load surface 21, the circumference of the optical disc D is guided by the circumference of the load surface 21 which is stepped down from the top surface of the tray 20. In this manner, the center of the optical disc D substantially overlaps with the center of the load surface 21 such that the optical disc D is stably seated on the turntable 34.

However, recently, the diameter of the optical disc D is very diverse. For example, a circular CD has a diameter of 120 mm, or alternatively may have a diameter of 80 mm. To accommodate these two diameters, the first load surface 21 is sized to hold a CD having the larger diameter of 120 mm, and a second load surface 23 is further formed to be stepped down from the load surface 21 with a smaller size for holding a CD having the smaller diameter of 80 mm. However, when the diameter of a CD varies from 120 mm or 80 mm, the stepped load surfaces 21 and 23 of FIG. 1 do not guide such a circular CD to be stably seated on the turntable 34.

Furthermore, optical discs called fashion discs have a variety of shapes, such as a name card shape, a flower shape, and a Christmas tree shape. The size and shape of the fashion discs are not uniform. The conventional stepped load surfaces 21 and 23 of FIG. 1 do not guide such fashion optical discs to be stably seated on the turntable 34.

In addition, an optical disc drive may be installed vertically as shown in FIG. 2. For example, as the size of a desk top computer 90 becomes smaller, an optical disc drive may be installed vertically in the desk top computer 90. In this case, the optical disc D undesirably moves in a direction of arrow A in FIG. 2 and is no longer stably seated on the turntable 34.

In order to prevent this problem in the prior art, as shown in FIG. 2, a protrusion jaw 26 extends from the top surface 24 of the tray 20 above the load surface 21. Although the protrusion jaw 26 aids in holding circular optical discs of uniform shape and size, the protrusion jaw 26 may not aid in holding fashion discs having various sizes and shapes.

Thus, a mechanism for securely holding optical discs is desired for vertical disc drives and/or for various sizes and shapes of the optical discs.

SUMMARY OF THE INVENTION

Accordingly, in a general aspect of the present invention, a disc drive such as an optical disc drive includes a tray for holding a disc with a spindle motor installed thereon for rotating a turntable of the spindle motor. The disc is secured to the turntable for being rotated by the spindle motor.

In an example embodiment, a fixing unit is disposed by the turntable for securely holding the disc to the turntable. In a further embodiment, the fixing unit securely holds the disc at locations of a perimeter of a clamping hole of the disc. For example, the fixing unit is comprised of a plurality of hooks that elastically engage with the perimeter of the clamping hole of the disc. In that embodiment, the hooks are disposed around a shaft of the spindle motor.

In another embodiment, the disc drive includes a lower case on which the tray is installed to be slid along guide rails, and a loading motor provides a driving force for sliding the tray along the guide rails.

In this manner, the spindle motor is installed on the tray with a mechanism for holding the disc at locations of the perimeter of the clamping hole of the disc. Thus, discs of various shapes and sizes may be secured to the turntable of the spindle motor. Furthermore, the disc drive of the present invention may be advantageously applied for slim vertical optical disc drives since the disc is securely held even in the vertical position.

BRIEF DESCRIPTION OF THE DRAWINGS

The above and other aspects and advantages of the present invention will become more apparent by describing in detail an exemplary embodiment thereof with reference to the attached drawings in which.

The figures referred to herein are drawn for clarity of illustration and are not necessarily drawn to scale. Elements having the same reference number in FIGS. 1, 2, 3, 4, 5, 6, and 7 refer to elements having similar structure and/or function.

DETAILED DESCRIPTION OF THE INVENTION

Hereinafter, an exemplary embodiment of the present invention will be described in detail with reference to the accompanying drawings.

Figure 3:
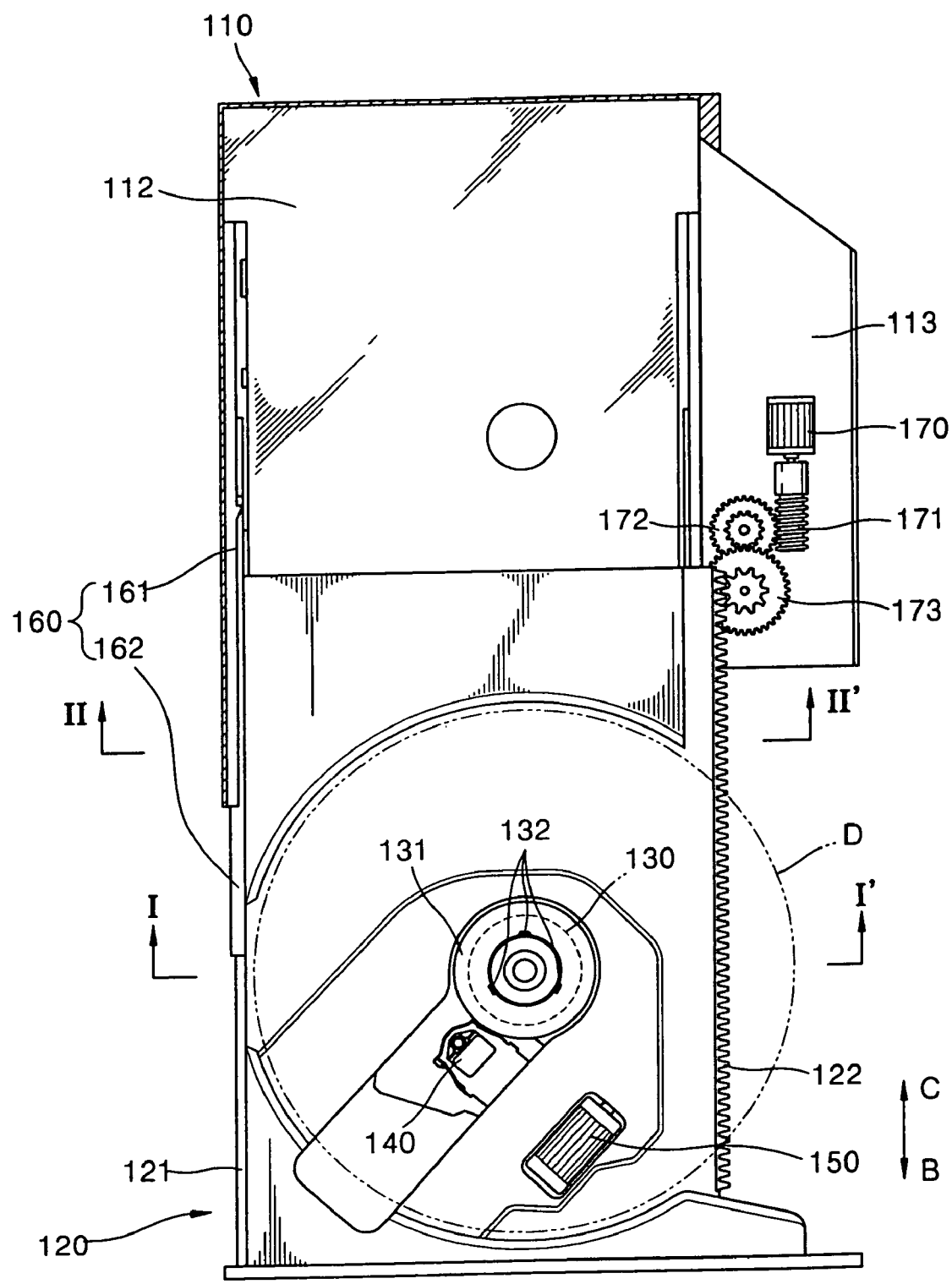
FIG. 3 is a plane view showing an optical disc drive with a mechanism for securely holding discs of various sizes and shapes, according to an embodiment of the present invention.
Figure 4:
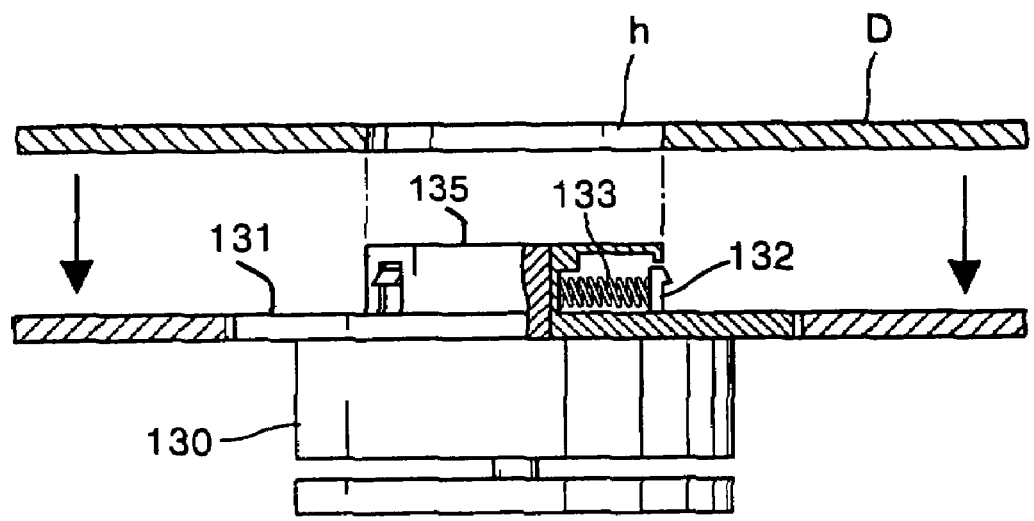
FIGS. 4 and 5 are cross-sectional views taken along lines I-I' and II-II' of FIG. 3, respectively.
Figure 5:
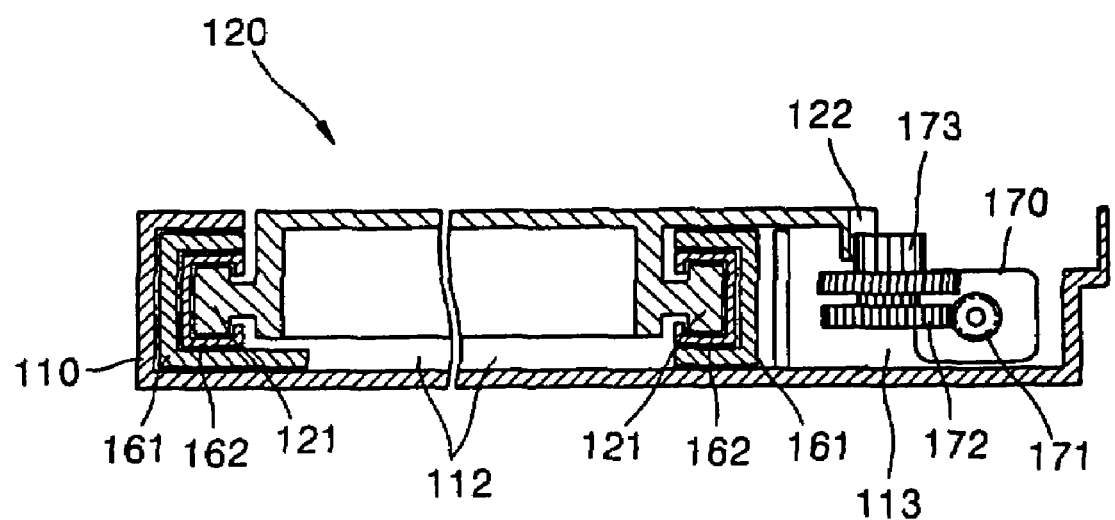
Figure 6:
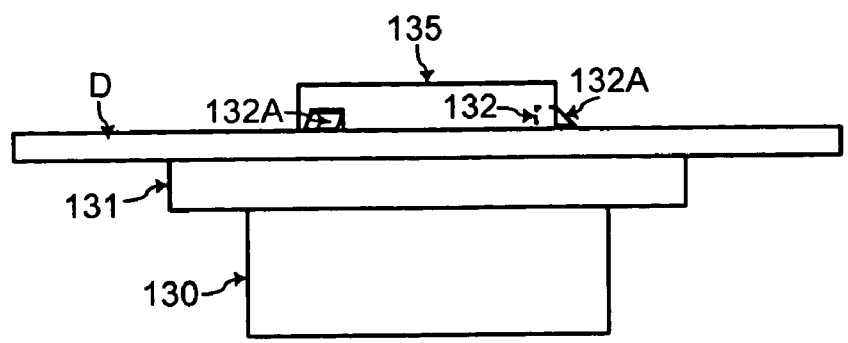
FIG. 6 shows a side view of the optical disc drive of FIGS. 3 and 4 with the optical disc secured to a turntable of a spindle motor by hooks disposed around the shaft of the spindle motor, according to an embodiment of the present invention.
Figure 7:
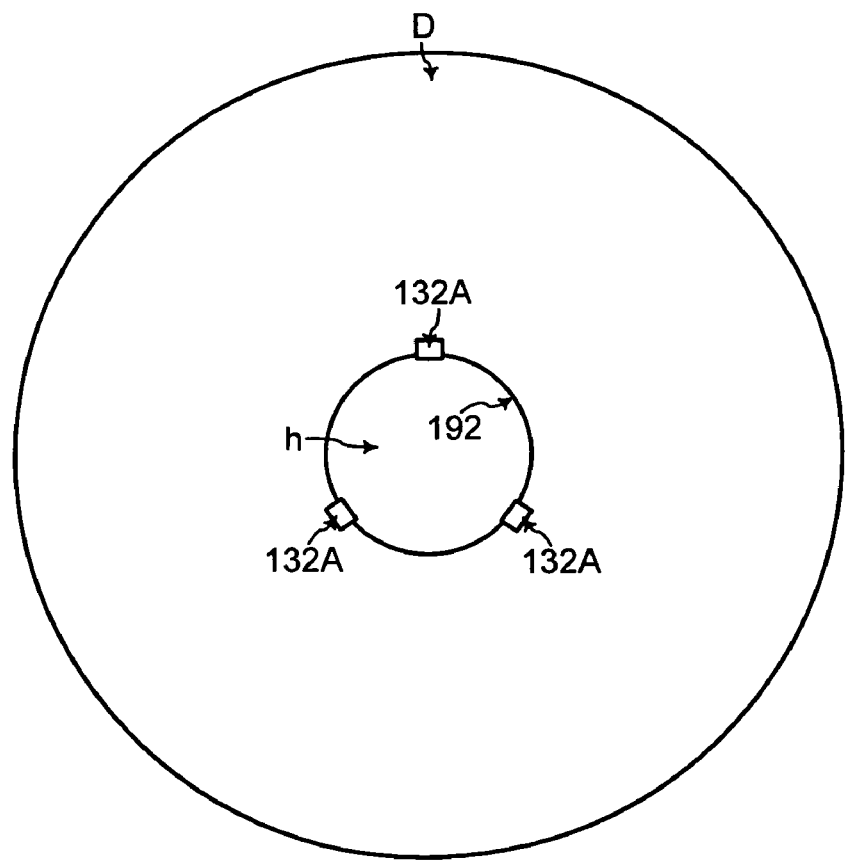
FIG. 7 shows a top view of engaging portions of the hooks of FIGS. 3, 4, and 6 disposed on top of the optical disc at locations of a perimeter of a clamping hole of the optical disc, according to an embodiment of the present invention.

FIG. 3 is a plane view showing an optical disc drive according to an embodiment of the present invention. FIGS. 4 and 5 are cross-sectional views taken along lines I-I' and II-II' of FIG. 3, respectively. FIGS. 6 and 7 show side and top views, respectively, of the optical disc drive when an optical disk is secured to a turntable of a spindle motor by hooks, according to an embodiment of the present invention.

In one example embodiment, the dimensions of an optical disc drive satisfy the specification of a slim optical disc drive. The slim optical disc drive is designed to be installed in a portable terminal, such as a notebook. The specification of the slim optical disc drive is well-known to those skilled in the art, and thus, detailed descriptions thereof are omitted herein.

Referring to FIG. 3, a tray 120 is installed in a lowercase 110 and slides in a direction of arrows B and C. A spindle motor 130 and an optical pickup 140 are installed on the tray 120. A driving motor 150 runs to cause a reciprocating motion of the optical pickup 140 in a radial direction of an optical disc D.

The spindle motor 130 rotates the optical disc D, and a turntable 131 is disposed around a shaft 135 of the spindle motor 130. A fixing unit for fixing the optical disc D is disposed on the turntable 131. The present invention may be implemented with various mechanisms for the fixing unit. An example of the fixing unit in FIG. 4 includes hooks 132 that elastically engage with a clamping hole h of the optical disc D. Referring to FIGS. 4 and 5, springs 133 elastically push the hooks 132 to be engaged with the perimeter of the clamping hole h.

The optical pickup 150 is slid by the driving motor 150 in the radial direction of the optical disc D for accessing various locations of the optical disc D during writing or reproducing of information.

The lower case 110 is comprised of a first region 112 and a second region 113. The tray 120 is installed in the first region 112 to be slid, and a guide unit 160 which guides a sliding motion of the tray 120 is disposed at one side or both sides of the first region 112.

FIGS. 3 and 5 show an example of the guide unit 160 having a first rail 161 and a second rail 162. The first rail 161 is a U-shaped member fixed at the right and left sides of the first region 112 of the lower case 110. The second rail 162 also having a U-shape is partially nested within the first rail 161 to be slid. An edge 121 of the tray 120 is nested within the second rail 162 to be slid.

The second region 113 extends from the first region 112 sideways, and a loading motor 170 is disposed in the second region 113. The loading motor 170 provides a driving force for sliding the tray 120. Various mechanical elements may be used to cause such a reciprocating sliding motion of the tray 120 using the loading motor 170. In an example embodiment, a rack gear and a pinion gear are used.

Referring to FIG. 3, a worm gear 171 is coupled to a shaft of the loading motor 170. In addition, a first gear 172 and a second gear 173 which are driven by the worm gear 171 are disposed in the second region 113. A rack gear 122 connected to the second gear 173 is disposed along a side of the tray 120. Referring to FIGS. 3 and 5, the rack gear 122 extends along a sliding direction of the tray 120 above the edge 121.

The operation of the optical disc drive having the above structure is hereafter described.

The tray 120 is unloaded so as to load or eject the optical disc D. Typically for unloading the tray, a loading/unloading switch (not shown) is pressed or an optical disc drive is installed in a computer. In any case, when an unloading command is transferred to a controller (not shown) of the optical disc drive from a drive program of the computer, the loading motor 170 is rotated. Then, a rotating force of the loading motor 170 is transferred to the rack gear 122 via the worm gear 171, the first gear 172, and the second gear 173, and the tray 120 starts sliding in a direction of arrow B.

First, the second rail 162 is slid in a direction of arrow B of FIG. 3 along the first rail 161 together with the tray 120. If an unloading operation is performed, the second rail 162 stops by a stop unit (not shown) and is not slid further. From this time, the edge 121 of the tray 120 is continuously slid in the direction of arrow B along the second rail 162. If the unloading operation of the tray 120 is completed, rotation of the loading motor 170 is stopped as shown in FIG. 3.

Referring to FIGS. 3, 4, 6, and 7, the optical disc D is loaded onto the turntable 131 to surround the shaft 135 while the tray 120 is unloaded. For securely holding the optical disc D to the turntable 131, the optical disc D is pressed downward onto the turntable 131 such that the clamping hole h surrounds the shaft 135.

In addition, referring to FIGS. 6 and 7, as the optical disc D is pressed downward, the hooks 132 initially are pushed radially inward until the optical disc D is disposed below top engaging portions 132A of the hooks 132. The top engaging portions 132A of the hooks 132 become disposed on top of the optical disc D at the three locations of a perimeter 192 of the clamping hole h, as illustrated in FIG. 7. Thus, with the engaging portions 132A of the hooks 132 disposed on top of the optical disc D around the perimeter 192 of the clamping hole h, the optical disc D is held securely to the turntable 131.

Figure 1:
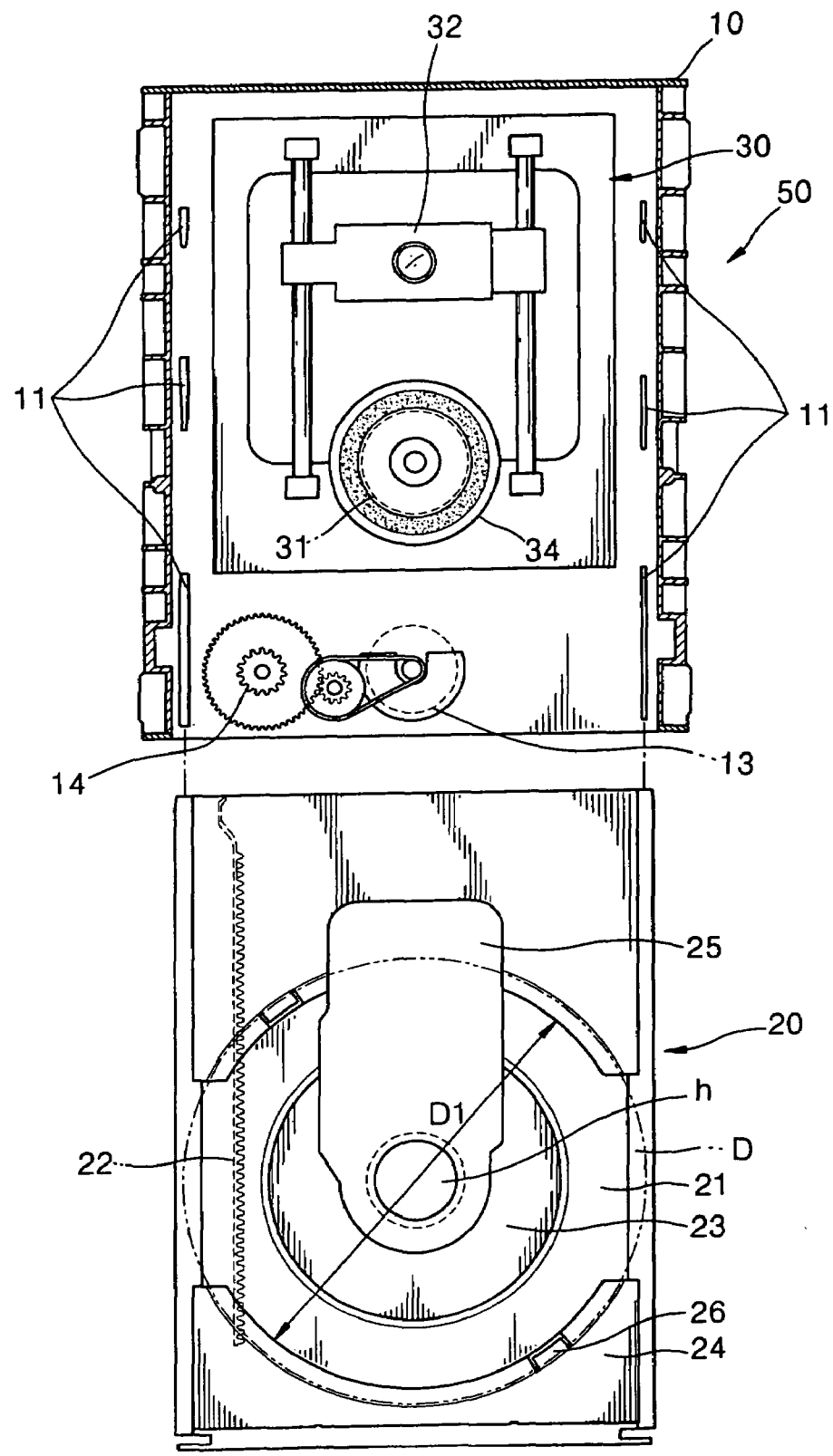
FIG. 1 is a plane view showing a conventional optical disc drive.
Figure 2:
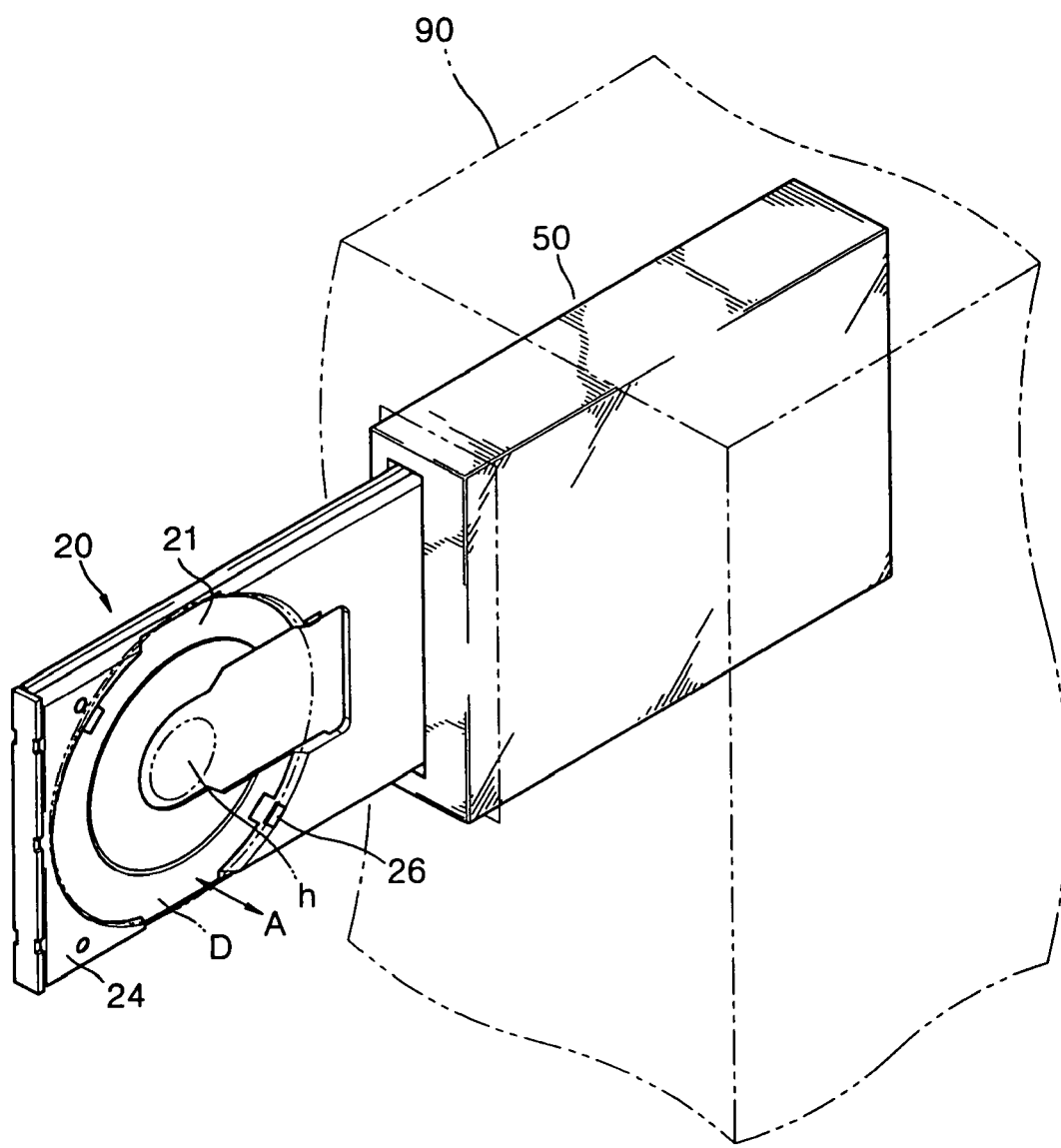
FIG. 2 is a perspective view showing a conventional optical disc drive installed vertically in a computer.

Furthermore, the size of the clamping hole h disposed toward the center of the optical disc D is typically of a similar size and shape irrespective of the size and shape of the disc D. Thus, the present invention is advantageous for securely holding optical discs of various sizes and shapes including the latest fashion discs. In addition, even when the optical disc drive is installed vertically as illustrated in FIG. 2, the optical disc D does not move in the direction of arrow A with the securing of the optical disc D using the hooks 132.

When the optical disc D is loaded on the turntable 131 and secured with the hooks 132, the loading/unloading switch (not shown) is pressed or the optical disc drive is installed in the computer. Then, when the loading command is transferred to the controller (not shown) of the optical disc drive using the drive program of the computer, the loading motor 170 is rotated reverse to a rotational direction of the unloading operation.

The rotating force of the loading motor 170 is transferred to the rack gear 122 via the worm gear 171, the first gear 172, and the second gear 173 such that the tray 120 slides in a direction of arrow C. In this manner, the tray 120 is loaded in a reverse order of the unloading operation. As occasion demands, the second rail 162 may be first slid and come into the first rail 161 together with the tray 120, and then, the tray 120 may be slid and come into the second rail 162.

By driving the spindle motor 130 and rotating the optical disc D in this state, information can be written on and/or reproduced from the optical disc D using the optical pickup 140.

The optical disc drive according to the present embodiment may be installed in a portable terminal, such as a notebook computer, or in a desk top computer. In particular, as the size of the desk top computer becomes smaller, a slim optical disc drive smaller than a half-height type optical disc drive is desired to be installed in the desk top computer. However, the conventional slim optical disc drive includes a tray that is manually loaded/unloaded, whereas the desk top computer has a half-height type optical disc drive loaded/unloaded by a motor.

Thus, the user is accustomed to the optical disc drive that is loaded/unloaded by a motor. The optical disc drive according to the present embodiment satisfies a specification of the slim optical disc drive, but also has a structure in which the tray is loaded/unloaded by a loading motor. Thus, the optical disc drive can advantageously be used in the small-sized desk top computer. In addition, unlike the half-height type optical disc drive, a spindle motor having a turntable onto which the optical disc is secured is installed on the tray, such that an optical disc having a variety of sizes and shapes is stably loaded. In addition, even though the optical disc drive with such a tray is installed vertically, the optical disc having a variety of shapes and sizes remains securely and stably loaded.

Although the optical disc drive satisfying the specification of the slim optical disc drive has been described in the present embodiment, the optical disc drive according to the present invention may also be applied for a half-height type optical disc drive within a desk top computer. In this case, a spindle motor having a turntable onto which the optical disc is secured is installed in the tray, such that an optical disc having a variety of sizes and shapes is stably loaded. In addition, even though a vertically-installed optical disc drive is used, the optical disc having a variety of shapes is stably loaded. The specification of the half-height type optical disc drive is well-known to those skilled in the art, and thus, detailed descriptions thereof are omitted herein.

Referring to FIGS. 3 and 7, for unloading the optical disc D, a mechanism may be implemented for pulling in the top engaging portions 132A of the hooks 132 radially inward away from the perimeter 192 of the clamping hole h of the optical disc D such that the optical disc D may subsequently be lifted up and away from the turntable 131. Alternatively, a user may manually push the top engaging portion 132A of at least one of the hooks 132 radially inward away from the perimeter 192 of the clamping hole h of the optical disc D such that the optical disc D may subsequently be lifted up and away from the turntable 131.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A disc drive comprising:
   a tray for holding a disc;
   a lower case on which the tray is installed to be slid;
   a loading motor for providing a driving force that slides the tray; and
   a spindle motor having a turntable and being installed on the tray;
   wherein the disc is secured to the turntable for being rotated by the spindle motor that is installed on the tray, and wherein the lower case comprises:
   a first region in which the tray is slid; and
   a second region, extended sideways from the first region, and on which the loading motor is disposed,
   wherein the second region of the lower case for holding the loading motor is not stepped upwardly.

2. The disc drive of claim 1, wherein the second region of the lower case is not stepped upwardly for additionally holding a plurality of gears driven by the loading motor.

3. The disc drive of claim 1, further comprising:
   a fixing unit disposed by the turntable for securely holding the disc to the turntable.

4. The disc drive of claim 3, wherein the fixing unit securely holds the disc to the turntable at a perimeter of a clamping hole of the disc.

5. The disc drive of claim 3, wherein the fixing unit is comprised of a plurality of hooks that elastically engage with a perimeter of a clamping hole of the disc.

6. The disc drive of claim 5, wherein the hooks are disposed around a shaft of the spindle motor and above the turntable.

7. The disc drive of claim 1, further comprising:
   an optical pickup installed on the tray, the optical pickup moving in a radial direction of the optical disc to write and/or reproduce information on the optical disc.

8. The disc drive of claim 1, wherein the disc drive is a slim vertical optical disc drive.

9. The disc drive of claim 1, wherein the disc drive is a half height type optical disc drive.

* * * * *